US006336862B1

(12) United States Patent
Byrne

(10) Patent No.: US 6,336,862 B1
(45) Date of Patent: Jan. 8, 2002

(54) METHOD FOR PLAYING A GAMBLING GAME

(76) Inventor: Christopher Russell Byrne, "Ramatuci" Ridge Road, Tasmania 7277 (AU)

(*) Notice: Subject to any disclaimer, the term of this patent is extended or adjusted under 35 U.S.C. 154(b) by 0 days.

(21) Appl. No.: 08/950,858

(22) Filed: Oct. 15, 1997

Related U.S. Application Data

(63) Continuation of application No. 08/617,807, filed as application No. PCT/AU94/00503 on Aug. 29, 1994, now Pat. No. 5,830,063.

(30) Foreign Application Priority Data

Aug. 27, 1993 (AU) ............................................. PM0847

(51) Int. Cl.[7] ........................... A63F 13/00; G07F 17/34

(52) U.S. Cl. ............................. 463/27; 463/20; 463/42; 273/143 R; 273/138.2

(58) Field of Search ............................. 463/26, 27, 20, 463/42; 273/193 R, 138.1, 138.2

(56) References Cited

U.S. PATENT DOCUMENTS 5,564,700 A * 10/1996 Celona ........................ 463/27

* cited by examiner

*Primary Examiner*—Benjamin H. Layno
(74) *Attorney, Agent, or Firm*—Edwin D. Schindler

(57) ABSTRACT

In a gambling game a collateral gambling game which can be won by players on at least one specific event occurring in the principal game, the collateral game being separate from the principal game but one when any of the possible winning events occur in the principal game, the payment to the player being calculated from the total value available for the game divided by the total number of players who bet on the specific winning event. The game gives a possibility for a large number of players to share in the success of a single player who has successfully won the main game. It may be used with various types of games including those using electronic gaming machines.

2 Claims, 3 Drawing Sheets

METHOD FOR PLAYING A GAMBLING GAME

This is a continuation of application Ser. No. 08/617,807, filed Mar. 6, 1996, which represents the U.S. National Phase application of P.C.T. Application No. PCT/AU94/00503, filed Aug. 29, 1994, now U.S. Pat. No. 5,830,063.

This invention relates to gaming and, in particular, to a collateral game to be played in association with a principal game.

BACKGROUND OF THE INVENTION

Generally, I shall describe the invention in relation to Keno and for convenience, I shall name the collateral game "Super Keno".

In the game "Keno", a player attempts to select a number of winning numbers out of a predetermined set of numbers and the game normally has a number of classes or divisions of prizes depending on the numbers selected.

That is, the player can select a first group of numbers out of a total group, say, 10 out of 80 and can then further select the number of correct results when the winning numbers are selected from a relatively small number, say 4 of the 10 up to a high number, say the whole 10 of 10.

Of course, the likelihood of success becomes less as the percentage of the numbers required becomes higher and the rewards on winning are generally higher the less the likelihood of success.

Keno is played in a number of different venues from individual casinos, through a networked game across groups of venues, commonly known in Australia as Club Keno and also, in a general public game which may be played on a daily, weekly, or other basis and which is open to all players through a number of different outlets.

One seen problem with Keno is that it is an individual game and, generally, other players are not excited when there is a winner, except in the relatively unusual situation of winners of very high amounts.

SUMMARY OF THE INVENTION

It is the object of the present invention to provide a collateral game where players may take a second entry when they are playing the game, generally for a small additional investment and should the additional entry be associated with the winning entry in a predetermined way, then the holders of the entries in the collateral game, will share a jackpot based on the payments made to the collateral game.

In its broadest sense, the invention includes in a gambling game where there may be a number of events selected ones of which can lead to a winning result, a collateral game which can be entered by players selecting at least one of the winnings result types characterised in that where a or the selected result type is achieved, all players who had selected that result type are paid a share of the available amount for that result type which payment depends on the amount invested by the individual player and the total amount invested by players in the collateral game since there has last been a winning result of that result type.

The invention also includes in a gambling game where there may be a number of events one of which can lead to a winning result type, a collateral game which can be entered by players of the game in respect of selecting a parameter associated with the winning result type characterised in that on a winning result all players of the collateral game which have selected the parameter associated with the result type are paid a share of the available amount for that parameter of the result type which payment depends on the amount invested by the individual player and the total amount invested by players in the collateral game since there has last been a winning result in which the parameter has been selected.

In order that the invention may be more readily understood, I shall describe certain forms of the collateral game both as "Super Keno", that is the game associated with Keno, and as a machine based game and other applications.

DETAILED DESCRIPTION OF THE PREFERRED EMBODIMENTS

Figure 1:
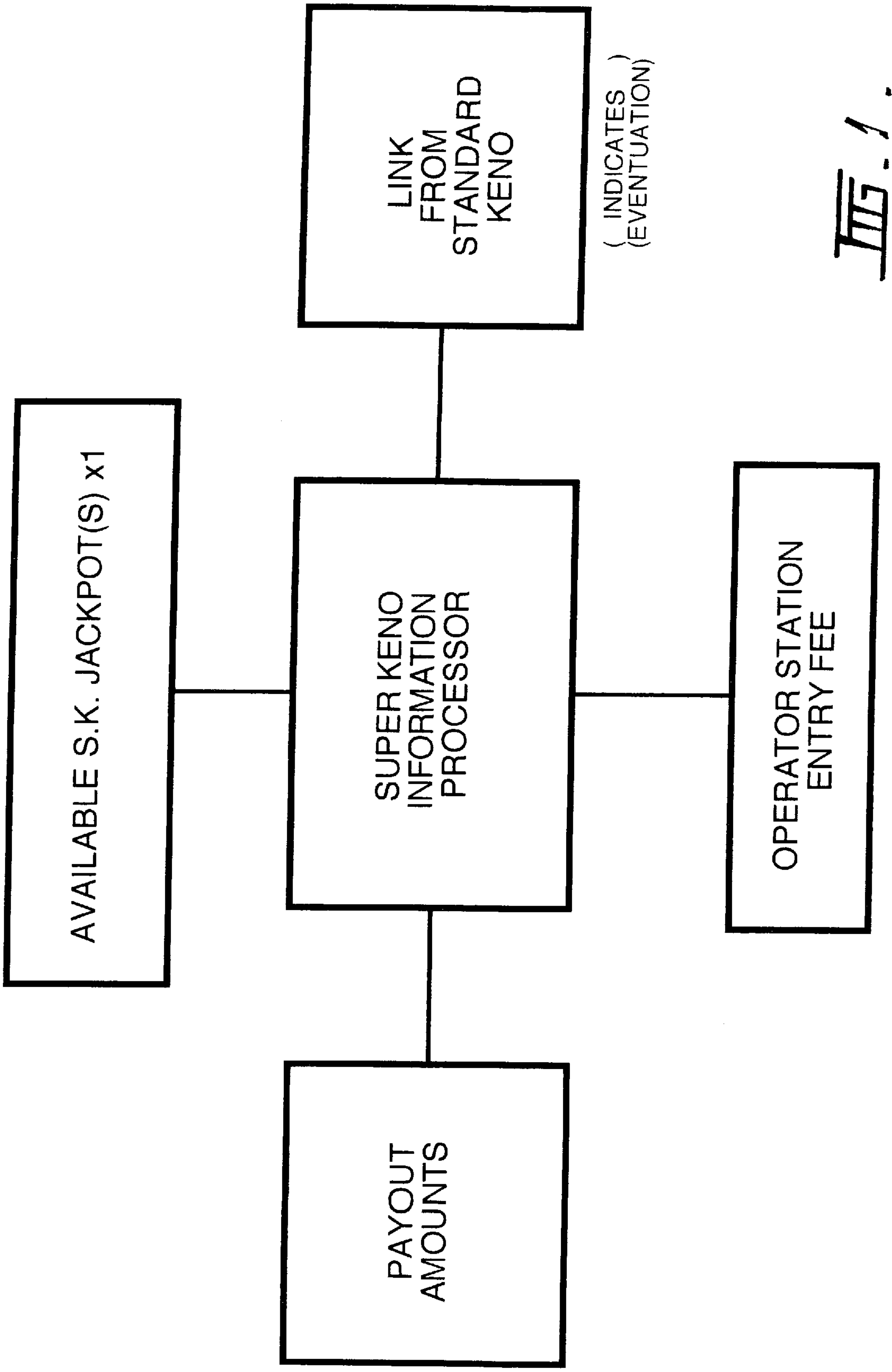
FIG. 1 show a block diagram of a standard Super Keno arrangement for a single operation.

Referring to the game "Super Keno" which is a collateral game to Keno, this game is designed to add excitement and interest for the players and to increase revenue for the house. The standard Keno game remains unchanged and Super Keno is simple to play and in operation and adds a new dimension to Keno;

Super Keno is an additional bet operating in conjunction with the Standard Keno Game and involves the provision of an additional, independent, self funding Jackpot Pool activated, in this embodiment, by any player obtaining any winning nine out of nine entry (Standard Keno ticket) or other result as previously determined by the operator. (3/3→10/10 etc). Super Keno possesses the desirable attribute of encouraging multi-game/multi-ticket play at no extra cost to the house although initial seeding is desirable. Seeding money can be returned to the house on an equitable basis over time.

The game can be played in a number of different ways and the operating rules for the game are simple. Examples are set out hereunder.

EXAMPLE 1

Multi-game play—Single Jackpot/Division.

(Example for Super Keno 9/9 Jackpot/Division).

A player wishing to enter Super Keno buys 5 (x-amount) standard Keno games (Eg: games 010–015; any desired standard Keno tickets may be played) and pays an additional, say, $1.00 (y-amount) Super Keno fee. This $1.00 (y-amount) is added to the Super Keno 9/9 Jackpot/Division (nine out of nine) and enters the player for say 5 (x-amount) consecutive Keno games or such other number as determined. A "share" in the Super Keno 9/9 Jackpot/Division is won by all players entered if any player playing standard 9/9 Keno wins the major 9/9 Jackpot/Division during the game(s) in which the Super Keno 9/9, entries are valid.

$$\text{Super Keno 9/9 share} = \frac{\text{Total "Super Keno 9/9 Jackpot/Division} - (\text{House Tax} + \text{Seeding})}{\text{Total number of Super Keno 9/9 entrants on winning of standard 9/9 Keno Jackpot}}$$

Thus if the total Super Keno 9/9 Jackpot=$875,000.00 and the "House+Seeding"=$475,000.00 and 100 entrants are recorded for winning game then $$1 \text{ share (Super Keno 9/9)} = \frac{875{,}000 - 475{,}000}{100} = \frac{400{,}000}{100} = \$4{,}000$$

Therefore 1 Super Keno 9/9 share=$4,000.00*(Based on calculations shown in Example 5) If there are a number of results which can lead to a Super Keno win, then the general equation is:

$$1 \text{ Super Keno } x/x \text{ Share} = \frac{\text{Total Super Keno } x/x \text{ Jackpot} - (\text{House tax} + \text{Seeding to new } x/x \text{ Super Keno Jackpot})}{\text{Total number of Super Keno entrants when standard } x/x \text{ Jackpot is won}}$$

Thus for 100 Super Keno entrants recorded for the winning game (9/9) each would receive $4,000.00 each. The scenario would be the following. One person wins the standard 9/9 jackpot, say approximately $600,000 and at the same time 100 people win $4, 000 each, the value of one share in the Super Keno—9/9 Jackpot. It will be appreciated that this can lead to much greater excitement than would be the case if there is only a single winner and can provide great publicity for the house.

If required, the game could be played for any other result, such as 3/3 →10/10 as pre-determined and entries could be made for Jackpot divisions relating to any successful result.

Operating Modes: (Super Keno can operate in a number of different modes).

1. Single—Jackpot/Division: multi-game (already described—see Example 1.)
2. Single—Jackpot/Division: Single-game
3. Multi—Jackpot/Division: Single-game
4. Multi—Jackpot/Division: Multi-game Super Keno can also operate with smaller Jackpots/Divisions activated by smaller standard Keno Jackpot/Divisions. ie. Results such as:

1. 8 out of 8 (8/8)
2. 7 out of 7 (7/7)
3. 6 out of 6 (6/6)
4. 5 out of 5 (5/5)

Super Keno can also be used with probable larger Jackpots which occur in larger standard Keno Jackpots/Divisions; ie. Results such as:

1. 10 out of 10 (10/10)
2. 11 out of 11 (11/11)

For all Super Keno Jackpots/Divisions, a starter Jackpot (seeding) may be desirable to ensure that even if there is an early win in the Keno game which would lead to a Super Keno payout. Although in some of the equations, we have shown the seeding being deducted, it may be preferred to use a manner of repaying the seeding which impacts on winners as little as possible, that is over time.

Whilst I have described Super Keno as being associated with players of the Keno game, it can, if required, also operate in an independent mode where a standard Keno entry need not be purchased.

Referring to the operating modes set out above:

1. Single Jackpot/Division—multi-game (see Example 1)
2. Single Jackpot/Division—single-game.

EXAMPLE 2

For Super Keno 7/7 division. A player wishing to enter "Super Keno 7/7" buys 1 standard Keno game (eg game 115) and pays an additional $1.00 (y-amount) Super Keno 7/7 fee. This $1.00 (y-amount) Super Keno fee is added to the Super Keno 7/7 Jackpot/Division. Any desired standard Keno ticket may be played, any amount of Super Keno 7/7 shares may be purchased. A share in the Super Keno 7/7 Jackpot/Division is won by the player if any player playing standard 7/7 Keno wins the full standard 7/7 Keno division in game number 115.

3. Multi Jackpot/Division: Single-game

EXAMPLE 3

A player (Player A) wishing to enter Super Keno buy, 1 (x-amount) standard Keno game (Eg: game 115) and pays an additional Super Keno fee (y-amount) per required Super Keno Jackpot/Division as entered (3/3→10/10. (Any standard Keno Division may be played.) The Super Keno Jackpot/Division fee(s) as entered are added to the respective Super Keno Jackpot(s)/Division(s). The player may purchase as many shares per division as required. If any player playing standard Keno wins a full division in game number 115 and the full standard Keno Jackpot/Division (3/3→10/10, etc) corresponds to a selected Super Keno Jackpot/Division entered by player A then Player A will receive 1 share of the respective Super Keno Jackpot/Division as entered.

4. Multi Jackpot/Division: multi game

EXAMPLE 4

A player (player A) wishing to enter super Keno buys 10 (x-amount) standard Keno games (eg 010–020) and pays an additional Super Keno fee (y-amount) per respective Super Keno Jackpot/Division as entered (3/3→10/10 etc as desired). The Super Keno Jackpot/Division fee(s) entered (by player A) are added to the respective Super Keno Jackpot/Division(s). The player may purchase as many shares per division as desired. If any player playing standard Keno wins a full division during the Super Keno games (010–020) paid for the Player A and the full standard Keno Jackpot/Division (3/3→10/10 etc) corresponds to a selected Super Keno Jackpot/Division (as entered by Player A) then Player A will receive 1 share of the respective super Keno Jackpot/Division entered.

Super Keno Calculations:

EXAMPLE 5

Based on 125 standard Keno Games per day. 100 people playing super Keno per 5 games (at $1.00 per 5 games). The Super Keno Revenue=100×25=$2,500 per day. After 350 Days super Keno Revenue=$875,000. This is a very simple example of calculations involved.

Super Keno Extra:

Super Keno: Extra is designed to allow players to enter all super Keno Jackpots/Divisions and play multiple (x-amount) standard Keno Games as required. (the Super Keno fee is distributed to all Super Keno Jackpots/ Divisions).

A player wishing to enter "Super Keno: Extra" buys 20 (x-amount) standard Keno games (eg. 010–030) and pays an additional. amount $2.00 (y-amount) "Super Keno extra" fee. This $2.00 (y-amount) Super Keno extra fee is distributed to all Super Keno Jackpots/Divisions 3/3→10/10 etc) as determined. On any winning Super Keno Jackpot/ Division (3/3→10/10 etc), Super Keno players entered at the time of the win are paid their calculated share amount. (Super Keno x/x result is activated by standard Keno x/x result).

The calculation is:

$$1 \text{ Super Keno share} = \frac{\text{Total amount held in respective Super Keno Jackpot/Division minus (House Tax + Seeding to respective Super Keno Jackpot)}}{\text{Total number of players (Super Keno players entered in the winning Super Keno Jackpot/Division at result}}.$$

Super Keno: Players Choice

The provision whereas players may choose the Super Keno Jackpot(s)/Division(s) they wish to enter.

A player wishing to enter "Super Keno: Players choice" buy, 5 (x-amount) standard Keno games (eg. 010–015) and pays an additional $1.00 (y-amount) "Super Keno: Players Choice" Fee. This fee is added to the respective Super Keno Jackpot(s)/Division(s) as entered. On a division winning Super Keno Players entered are paid their calculated share amount, (Super Keno x/x success is activated by a standard Keno x/x win).

Calculated thus:

$$1 \text{ Super Keno share} = \frac{\text{Total amount held in respective winning Super Keno Jackpot/Division minus (House Tax + Seeding to respective Super Keno Jackpot)}}{\text{Total number of Super Keno extra players entered in respective winning Super Keno Jackpot/Division at result}}$$

Player Information Display

Display units, which may be computer. operated, are desirable to allow Super Keno Players to observe the following information.

1. Indication to players that a Super Keno Jackpot/ Division has been achieved. This occurs when standard Keno Jackpot/Division) occurs. An audible indicator may also be used.
2. The respective winning Super Keno Jackpot/Division (3/3→10/10 etc).
3. The winning game number (eg. game 015)
4. The total available winning super Keno Jackpot/ Division (Cash amount). (Total available winning Super Keno Jackpot=Total Jackpot minus (House Tax+ Seeding)
5. The total number of shares purchased for winning Super Keno Game.
6. The cash value amount of each share.
7. The last Jackpot details may also be displayed (or Toggle between screens during quiescent times)
8. The winning standard Keno numbers (if desired)

One particular display screen could take the form:

Super Keno

WIN WIN WIN WIN

Winning super Keno Jackpot/Division 7/7

Total 7/7 Jackpot $50,000.00

Game Number: 015 winning 7/7 Shares purchased: 100

1 Share=$500.00 winning numbers: 5, 9, 15, 33, 34, 42, 79

Super Keno

If required, the information could be displayed in order with pauses between each display.

If required, a separate display unit can display all Super Keno Jackpots/Divisions in cash amounts.

Super Keno Jackpots

| Jackpot/Division | Jackpot |
|---|---|
| 3/3 | $100.05 |
| 4/4 | $715.65 |
| 5/5 | $1,512.75 |
| 6/6 | $4,728.09 |
| 7/7 | $8,652.10 |
| 8/8 | $14,720.50 |
| 9/9 | $400,000.00 |
| 10/10 | $1,200,000.00 |
| Present Game Number | 055 |

Super Keno Entry Fee (Registration Fee)

Any satisfactory means of entry to Super Keno can be used. The entry fee can be charged as either a cash or credit amount. 1 Super Keno x/x share=1 credit. It is envisaged that upon payment of the fee for Super Keno the following information will be printed on either:

1. Existing Keno ticket; or
2. A Super Keno ticket.

1. The game number(s) paid for;
2. The Super Keno Jackpot(s)/Division(s) as entered;
3. The cost per share per Jackpot/Division;
4. The number of shares purchased per Jackpot/Division;
5. The name of the staff member operating the Super Keno (or otherwise) machine;
6. The number of Standard Keno Games purchased (Game number(s).

Super Keno: Payouts

Upon receipt of a winning super Keno ticket x/x Jackpot/ Division) the Super Keno staff operator will pay the winning Super Keno player the required cash amount (or cheque) based on the number of shares purchased for the winning game, and the value of the winning share (as calculated).

Super Keno: Computer Software

The software required to operate Super Keno will need to be able to perform many tasks. The Super Keno software may be included with standard Keno on the standard system with Super Keno information printed on the standard Keno tickets if desired, or; if required, the Super Keno software may operate independently on a separate computer system with the Super Keno information printed on separate super Keno tickets.

The tasks required to be performed by the Super Keno Software are as follows:

1. Accept and record all Super Keno wagers;
2. Place all fees in respective Super Keno; Jackpots/Divisions (minus House Tax plus seeding);
3. Be able to recognise a standard Keno result. Thus the software needs to be actively linked to the Standard Keno system to do this.
4. Record and store all information relating to wagers, payouts, tickets;
5. Calculate all share payouts;
6. Payout on stored information (Late ticket claims);
7, Print all required Super Keno information on tickets;
8. Operate all display units;
9. Store Facility: The computer must have memory sufficient to store the results of each share purchased and this information must be accessible for some time after which it must be able to be archived. This is required for players who purchase large numbers of games at a time (eg games 010–090) and decide to check for winning results at a later time.
10. Provide all Financial/Statistical information regarding Super Keno wagers to a management report.
11. Operate in a Linked System (Super Keno) where desired. (see Super Keno: Multi-linking).

Super Keno: Multi-linked

It may be that casinos operating Super Keno may wish to link-up their Super Keno Jackpot amounts to provide larger Jackpots and more regular results. To do this it is necessary to operate all Keno (Standard) games at the same speed for all participating Casinos. All Super Keno information is to be displayed on display units per each participating casino. Exactly the same mode of operation will be used except it will be on a larger scale.

Figure 2:
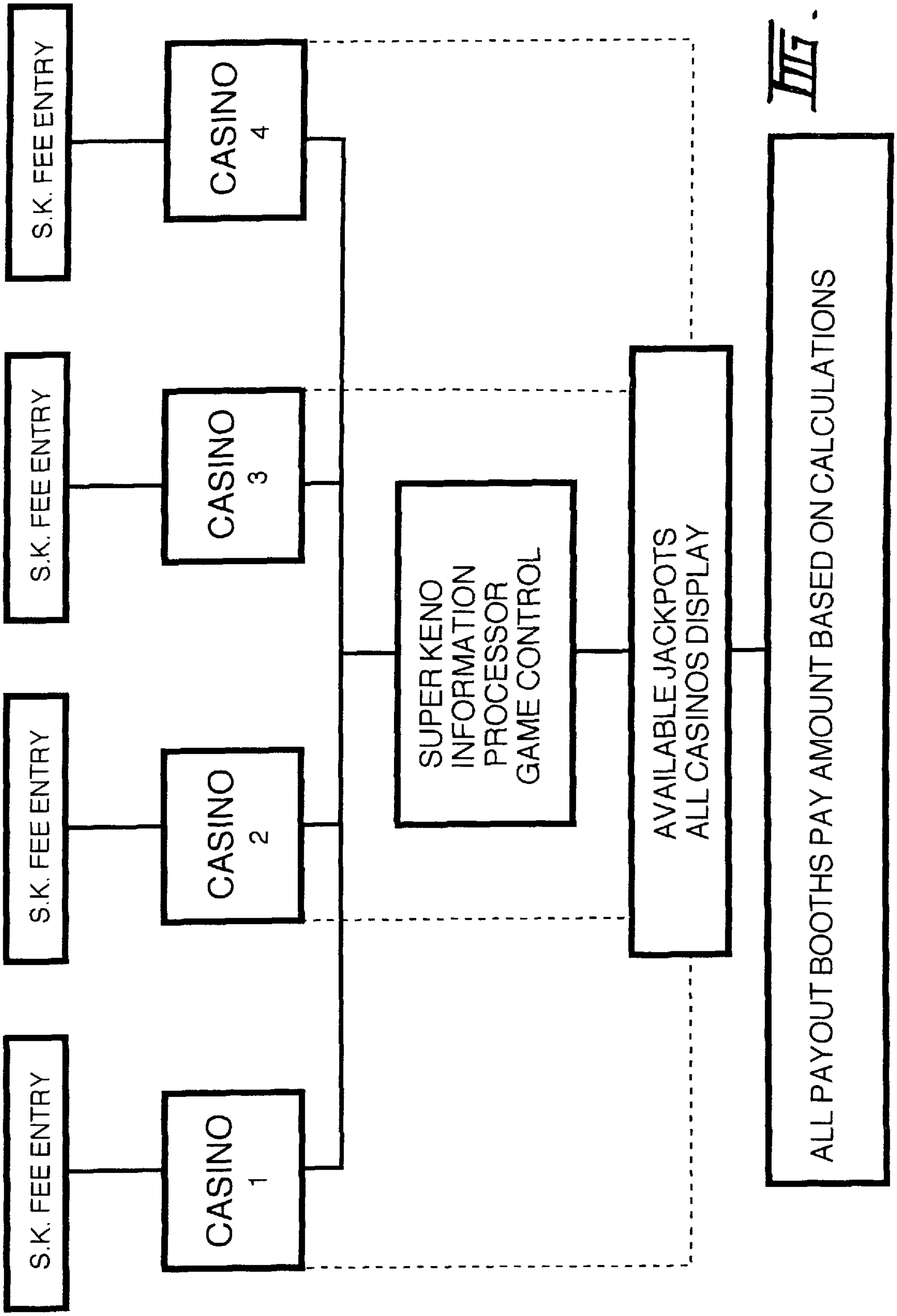
FIG. 2 show a block diagram of a standard Super Keno multi-linked arrangement.

FIG. 1 shows a block diagram of a standard Super Keno arrangement for a single operation and FIG. 2 shows a multi-linked arrangement.

Super Keno: Maths Equations

Mathematical equations for examples 2, 3 and 4.

Example Math Equation 2

Operating mode 2 Single Jackpot/Division—single game mode $$1 \text{ Super Keno } 7/7 \text{ share} = \frac{\text{Total Super Keno } 7/7 \text{ Jackpot/Division} - (\text{House Tax} + \text{Seeding})}{\text{Total number of Super Keno } 7/7 \text{ entrants at winning (in game 115) of standard Keno } 7/7 \text{ Jackpot}}$$

Example Math Equation 3

Operating mode 3 Multi-Jackpot(s)/Division(s): Single-Game $$1 \text{ Super Keno } x/x \text{ share} = \frac{\text{Total respective winning Super Keno Jackpot/Division } (x/x) \text{ (minus House Tax} + \text{Seeding)}}{\text{Total number of respective } (x/x) \text{ Super Keno winning entrants at the time of Standard } (x/x) \text{ Keno Jackpot/Division result (Game 115)}}$$

Example Math Equation 4

Operating mode 4 Multi-Jackpot(s)/Division(s): Multi-game $$1 \text{ Super Keno } x/x \text{ share} = \frac{\text{Total respective winning Super Keno Jackpot/Division } (x/x) \text{ (minus House Tax} + \text{Seeding)}}{\text{Total number of respective Super Keno winning entrants at the time of Standard respective Keno Jackpot/Division result } (x/x)}$$

Super Keno: Machine Play

EXAMPLE

For Super Keno when applied to personal Keno machines operating with a Game Controller. All machines operating at the same game speed—same game begin time and end time, the same number results will apply to each machine within the link-up of machines as controlled by the Game Controller.

EXAMPLE OF PLAY (1 Bank of 10 machines multi-linked by a Game Controller)

Figure 3:
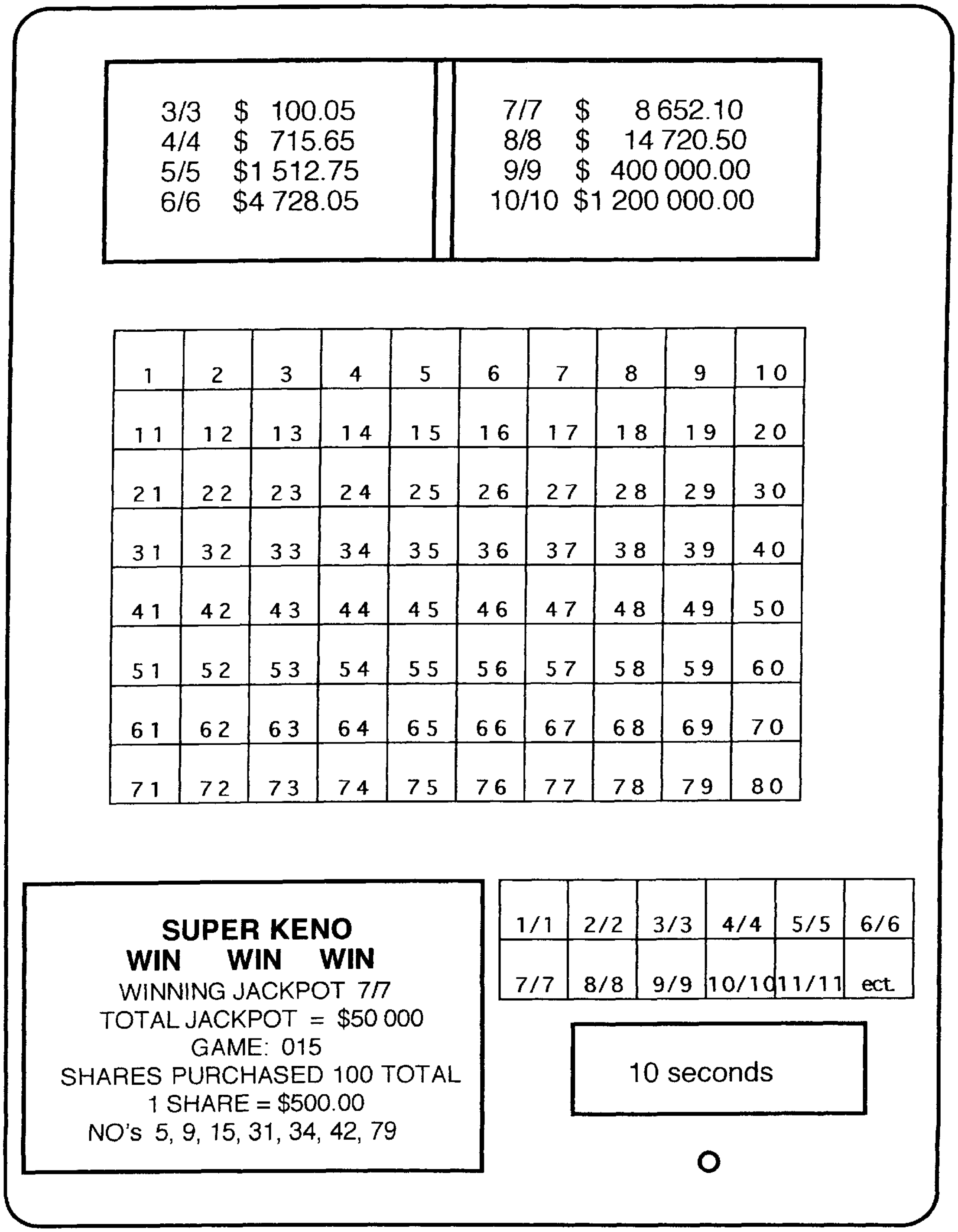
FIG. 3 shows a computer operated Super Keno display unit.

A player approaches a linked bank of Keno machines and observes that Super Keno is being offered. Super Keno Jackpots are offered for Super Keno Jackpot(s)/Division(s) of [(4/4→10/10 etc)=(x/x→y/y etc); four out of four Jackpot/Division to ten out of ten Jackpot/Division: Super Keno] 4/4→10/10 etc (x/x→y/y etc). Each machine has an assortment of buttons allowing entry to any desired Super Keno Jackpot/Division. One possible arrangement is illustrated in FIG. 3.

To play the player deposits "x"-amount of coins (or credit card) into the machine. The player then selects a desired Super Keno Jackpot(s)/Division(s), (Say 7/7) and allots 1 CREDIT (x-amount) to same. (1 CREDIT entry to Super Keno 7/7). The player then selects the standard Keno Division (1/1–10/10 etc) as desired and the standard Keno number(s) as desired. From the time indicated on the Digital Clock counter the player can see there is about 5 seconds remaining until the next Keno Game begins. The player then watches the drawn game. After the results are known the machine completes all relevant payouts and is ready to accept new wagers/instructions.

Super Keno: Machine Play (Personal Keno Machine—Personal Gaming Keno Machines) Example for Super Keno when applied to personal machine use Keno operating with no Game speed controller, that is all machines operating at their own rate and independently draw numbers.

EXAMPLE OF PLAY (1 bank of 10 machines—no game controller)

Say Super Keno Jackpots/Divisions are offered for 3/3–10/10 etc. Each machine has an assortment of buttons allowing entry to any desired Super Keno Jackpot/Division.

The player deposits "x"-amount of coins (or credits from credit card) into the machine. The player then selects a desired super Keno Jackpot(s)/Division(s) (say 7/7) and allots 1 CREDIT (x-amount) to same. (1 credit=1 share for Super Keno 7/7) The player notices that as soon as the Super Keno Jackpot(s)/Division(s) have been paid for, a Digital Clock lights up and becomes operational (counts backwards) as soon as normal standard play begins. The player then selects the standard Keno Division (1/1–10/10 etc) as desired and the standard Keno number(s) as desired. As soon as the player pushes the "deal" (start) button s/he is entered in super Keno. This can be indicated by the digital clock counter beginning to count backwards. As soon as the "deal" (number drawn) is completed the digital clock counter freezes showing time remaining for Super Keno entry, a predetermined amount of time is given. The machine "un-freezes" as soon as normal Keno play continues. The player is entered for 1 share (x-amount) and this 1 share enters the player for "y"-amount of time allowed. If any player playing in the bank of Keno machines wins a standard Keno Division (3/3–10/10) corresponding to a Super Keno Jackpot/Division (say 7/7) as entered by the player, and this occurs while the player is entered for Super Keno, that is the player's machine was operational "dealing" at the time of the standard 7/7 result, then the player will receive 1 shares worth of the total available 7/7 Super Keno Jackpot/Division. The amount won is displayed on the machine. After the results are known the machine completes all relevant payout(s) and is ready to accept new wagers/instructions.

Summary of Super Keno when used with Keno machines (personal) with no game speed control.

1. Upon payment for Super Keno share(s) a clock counter (TIMER) displays "x"-amount of time.
2. Upon the game start (player pushes "deal" button) the player is entered for Super Keno. (Indicated by moving clock counter)
3. After the deal has finish (1 game) the clock (counter) Freezes
4. If there is time remaining on counter the clock (counter) un freezes again (showing entry to Super Keno) at the restart of play
5. The share(s) payment allows the machine to allot "x-amount" of time for Super Keno registration (Eg. 30 seconds).
6. The player will win 1 shares worth of respective super Keno Jackpot if the clock counter on the machine is operational (moving backwards) at the time of the result.
7. All machines in the bank can detect a standard Keno result and can instantly relay this information (winning standard Division) to all machines in the link-up.

Super Keno; Additional Notes

Proportion Bets:

Super Keno can allow for the provision of proportion bets. i.e. A player many wish to bet on proportions of the full result for any desired Jackpot/Division.

In order to do this, the player places a wager in the hope that any player will win a 7/8 or 8/9, or 9/10 etc (as selected) during the game(s) for which the player is entered and which are results which will win a prize for the Keno player.

This proportions allowed:

=4/5, 5/6, 5/7, 6/7, 5/8, 6/8, 7/8, 6/9, 7/9, 8/9, 6/10, 7/10, 8/10, etc

Player may purchase as many shares per Jackpot/Division as desired.

The Golden Rule may be applied 1 CREDIT=1 share.

Winners Keno

An addition to the standard game "Winners Keno" allows players to select the number of winners per desired standard Keno Division (1/1–4/4 etc).

Player must select how many winning results (full division) will occur per selected standard Keno division per game(s). Players may wager on a single or multi-game basis. That is players may select the amount of full winning results for any single Keno Division for 1 game (1 standard Keno game) or; multi-game; Players may select the amount of full winning results for any single Keno Division (as desired) for a group of games. Multiple divisions (winners Keno Division 1/1–4/4 etc) may be played on a single game basis or multiple using the concept the players may;

1. Place their "Winners" wager (x-amount) only and not be required to purchase extra normal Keno tickets, or;
2. Purchase "X" amount of normal Keno tickets and pay an additional fee of x-amount for the "winners" wagers; (or both).

Number of Winners Bet

"Winners" Keno is designed to allow players to bet on the number of winners (full standard Keno results—1/1 –4/4 etc) per selected Winners Keno Jackpot/Division 1/1–4/4 etc) per selected Keno game or group of selected Keno games. The players may bet on how many 1 out of 1's, or 2 out of 2's, or 3 out of 3's etc will result for game "x" (or multiple games) of standard Keno.

Proportion Bets

"Winners" Keno can also permit the use of proportion bets all described earlier herein in-relation to Super Keno. In this, players may wish to bet on proportions of the total result for any desired Division which will still lead to a winning result to the Keno player. (Players select how many, say 4/5 or 3/4 results will occur in any game or group of games.)

Zero Bet

There may be provided a bet against their being any result which leads to a jackpot being held by a player of the Keno game.

Wagers:

A wager is placed at the beginning of any standard Keno Game or group of games. Depending on the situation required the player may be required to purchase a required number of standard Keno tickets in order to play winners Xeno. That is Winners Keno Fee+Standard Keno tickets Fee. After the results are known, and if a payout is in orders the player will win a payout based on 1. A share of the respective "winners" Keno Jackpot as entered. or;
2. A payout based on calculated set odds.

The wager is used to either finance a "Jackpot Base" for winners Keno, or used to help finance set odds payouts (or devised payouts) for winners Keno. A player may register a "winners" Keno wager, which is independently recorded and placed in the respective "winners" Keno Jackpot/Division as entered by the player. The player must estimate how many prizes (full winning standard Keno results) will be awarded to winning players correctly selecting a desired Keno Division 1/1–x/y) per "x" number of game(s) played. So if a player believes that "$x_y$" winning results will-occur per "x" number of game(s) for the division of 3 out of 3, the situation would be thus:

Example 1 Single game

Single Jackpot/Division

A player places a wager "x" amount on "Winners Keno" Division 3 only (3 out of 3). The player believes that for one game only "$x_y$" number of full winning results will occur in that one game (for division 3/3 only). So if "$x_y$"=9 (nine) and 9 full results are won by other Keno players (not necessarily entered in "Winners Keno") for division 3/3 for that game then the player(s) entered into Winners Keno 3/3, for that game wins a share of the total available Winners Keno 3/3 Jackpot.

The same scenario apples to all Winners Keno Jackpot/Divisions. Winners Keno can be used in any desired game/division format. i.e. Formats for winners Keno 1) Single Game: single Divisions/Jackpot (Example 1), 2) Multiple game: Multiple Jackpot(s)/Divisions, 3) single game: Multiple Jackpots/Divisions, or 4) Multiple games: Single Jackpot/Division

EXAMPLE 4 MULTI-GAME

Single Jackpot/Division.

A player places a wager "x" amount (winners Keno wager) on Winners Keno 3/3 division only (3 out of 3). The player believes for "y" number of standard games "q" number of full winning 3/3 results will occur in the "y" games. So if "q"=27 (number selected by player) and 27 (twenty Seven) full winning 3/3 results do occur within the total number of "y" games entered for, then the player(s) who have correctly selected 27 winners for 3/3 winners Keno win a share (based on number of shares bought) of the total available 3/3 Winners Keno Jackpot.

EXAMPLE 3 SINGLE GAME

Multi Jackpots/Divisions

A player places a Winner Keno wager of "x" amount on a selection of Winners Keno Jackpots (say 1/1→3/3) for 1 game only, the fee is distributed to all respective Winners Keno Jackpots. The player then pays an additional fee to enter Standard Keno as required and selects the number of winners per respective Winners Keno Jackpot/Division as desired. If the player correctly selects the number of winners for a respective Winners Keno Jackpot/Division in the particular game then the Player wins his share of the available Jackpots.

Winners Keno—Entry Fee

Preferably, on payment of the fee for winners Keno the following information will be printed on either 1) Existing Keno ticker, or 2) A Winners Keno ticket.

1. The game number(s) paid for;
2. The Winners Keno Jackpots as entered (1/1→4/4 etc);
3. The cost per share (fee paid) per Jackpot/Division;
4. The number of required Standard Keno games purchased.

Winners Keno—Payouts

Upon receipt of winning Winners Keno ticket the "winners Keno" staff operator will pay the Winners Keno player the required cash amount (or cheque) based on the number of shares purchased for the winning game, and the value of the share(s) as calculated.

Winners Keno Computer Software

The software required to operate Winners Keno will need to be able to perform many tasks, which are basically those previously discussed in relation to Super Keno earlier herein and will not be again discussed.

Player Information Display

Possible display units for super Keno were discussed earlier herein and, in general terms the displays for winners Keno can be similar and will not be further described.

Winners Keno: Multi Linked

It is envisaged that casinos operating winners Keno may wish to link-up their Winners Keno Jackpot amounts. Such a linkages was described earlier herein in relation to Super Keno and will not be further described.

Winners Keno; Personal Gaming Machines.

The use of personal gaming machines with Super Keno was described earlier herein, the same bases can be used in respect of Winners Keno.

Winners Keno: Machine Play

This was discussed in relation to super Keno and the same general conditions apply.

Winners Keno Proportion Bets

This concept was discussed in relation to Super Keno and the same requirements apply.

General Analysis and Additional Applications

Super Keno (wager on any winning division) and Winners Keno (wager on the number of winners per respective Jackpot/Division) are both applications of the general collateral concept of the invention.

In general terms, this concept operates in two modes:

MODE 1 Operation is described in Super Keno: Players must wager on a selected Jackpot/Division to be won by any standard game player in a selected game. Usually Mode 1 is used on progressive Jackpots only.

MODE 2 Operation is described on the number of winner per respective Standard Game Jackpot/Division. Mode 2 can be used on non progressive and progressive Jackpots. Non progressive jackpots can be termed Revenue Based Jackpots.

These two modes of operation allow the concept to be applied to a wide variety of pre established games as well as Keno.

The concept is an independently funded Jackpot pool (non progressive where desired for Mode 2 operating in conjunction with the Standard game and is activated by:

MODE 1 The results of any standard game Jackpot(s)/Division(s) in any selected Standard game (any Standard game player may win the Standard game Jackpot/Division.) Thus for Mode 1 the Jackpot/Division is activated by any player playing the Standard game, winning the full Standard Jackpot/Division which corresponds to the collateral jackpot/Division as entered by the players(s).

MODE 2 The collateral Jackpot/Division is achieved by any player correctly selecting the number of Standard game winners in a selected Jackpot/Division corresponding to the collateral Jackpot/Division as entered.

For each Mode 1 and 2

Fee The fee paid to enter the collateral game is placed in the appropriate Jackpot/Division as entered.

Payout The payout paid to collateral game players is calculated as a share amount based on 1) the number of shares purchased by the player, 2) the total number of winning shares for respective Jackpot/Division, 3) the total available appropriate Jackpot as entered.

Application of the Concept to Lotto Type Games.

This related to any lottery draw having a major jackpot with smaller divisional prizes (stepped prizes). In most cases the lotteries operate by drawing "x" numbers out of a maximum possible numbers "y". This scenario is to be used for this example, 6 out of 45. Now remembering that:

Mode 1 Players select a desired jackpot/Division to be won by any player playing the standard game.

Mode 2 Players select the number of winners per division offered for any given game.

Mode 1 Example

A player A buys 1 share "x" in the collateral game to Tattslotto Division 1 for a game. The player A hopes that any player playing the main game will achieve the main prize thus activating the collateral game Division 1 Jackpot for the game. If so, the player wins the share amount calculated as previously set out.

Mode 2 Example

A Player A buys 1 share (x) for the collateral Tattslotto Division 3 jackpot. The player makes an estimate there will be five hundred winning tickets of Division 3. If this does occur, then the player wins and his prize share of the jackpot will be the total available jackpot divided by the number of players who estimated that there would be the correct number of winners.

This example for Tattslotto can be applied to Football Pools and Soccer Pools.

The concept can be applied to Mega Bucks, Poker Machines and Link-ups; that is any electronically linked up gaming machines having a Jackpot (progressive) as well as a Standard payout.

Operation For Machine Application

Mode 1 Operation

Players wishing to play the collateral game are charged a fee which is added to the respective Jackpot as entered. The fee=1 credit (x amount) and buys the player 1 share (x) in the Jackpot. Any number of shares may be purchased. This fee lasts the player for, say, "y" amount of time and this time may be indicated on a digital or analogue clock timer display. The machine may offer a selection of buttons or the like allowing entry to the offered Jackpot/Divisions and to the number of shares required to be purchased by player per Jackpot. The total amount of time is indicated on the clock counter as soon as the required fee is entered by the player into the machine.

The clock counter display begins to count backwards in seconds (x second intervals) as soon as standard play begins (player pushes standard "deal" button). Players pay usual fee(s) for standard play.

As soon as standard play stops (pauses between games) the clock counter freezes and indicated the time remaining. An indicator light may be activated when the clock counter enters "freeze" mode. This illuminated light allows the player to know that the time remaining is frozen. When standard play resumes the indicator light goes out and, if required another light becomes illuminated to show re-entry to the Jackpot as entered.

The Jackpot(s) are fully displayed as the available Jackpot (total respective Jackpot−house tax+seeding) to all players. The main Jackpot display for the bank of machines in the link could be located near the standard linked Jackpot display and on all Personal Gaming Machines in the link.

If any player playing the Bank of linked machines wins the standard game main Jackpot and the collateral Jackpot is activated while the player is entered then the player wins his/her purchased shares worth of the available collateral Jackpot.

If desired by an operator an additional fee for time allowed may be charged. This would allow players to select the amount of time required and to pay for this. The fee would be added to the respective Jackpot as entered.

The collateral game when applied to games such as: Mega Bucks, Poker Machines and Link-ups.

The game can be played with any linked-up electronic gaming machines having a progressive jackpot as well as standard payouts.

Example of Machine Play.

Mode 1 operation

Where a collateral Jackpot is being offered, the collateral game operates in conjunction with the standard main game progressive Jackpot and is activated by this. That is, any player playing the bank of interlinked machines who wins the main Jackpot (standard game) automatically activates the collateral Jackpot. and all players who are entered into the collateral game will receive a share of the collateral Jackpot.

The Jackpot is preferably displayed on a large visual display unit at the top or near the bank of machines or alongside or together with the display of the current Standard Jackpot.

Upon deciding to play player A deposits "x" amount of coins (or credit) into a desired machine. The machine displays the inputted credits. The player then selects the collateral Jackpot he/she wishes to enter and selects the number of shares he/she wishes to purchase (possible 1 credit=1 share).

If desired by the operator players may be charged an additional fee for time entered in the collateral Jackpot thus allowing players to select the time they wish to be entered. This additional fee is added to the respective collateral Jackpot as entered by the player.

Upon selection and payment for the collateral Jackpot/Division and the number of shares required, a clock counter will indicate the time available for a win in the main Jackpot to provide a win in the collateral Jackpot.

The player the begins standard game play. As soon as this is initiated the clock counter begins to count backwards.

As soon as standard play is paused (between games) the clock counter freezes and a non entry light may become illuminated thus indicating to the player that he/she is not entered in the collateral Jackpot because the machine is not in operation mode. Upon start of play again the clock counter unfreezes and again begins to count backwards. An entry light may become illuminated to indicate this. Once the time has expired the player is no longer entered in the collateral game.

If any player playing the standard game within the bank of machines wins the standard main Jackpot while the player is entered in the collateral Jackpot then the player wins his/her shares worth of the available collateral Jackpot as displayed.

Bingo

Mode 2 Operation

Players select the number of balls drawn required to activate a Bingo.

As an additional application the collateral game can be applied to Bingo on a Mode 2 basis.

Example of Play

Before any given game begins player A buys 1 share (x amount) in the collateral Bingo Jackpot. The player then selects the number of balls drawn for a required Bingo result. This fee (1 share purchased.by the player) is added to the Revenue Base for the game. The player has- selected that (say) 23 numbers will be drawn for a Bingo to be achieved in the game. On Bingo, a full card, if 23 numbers have been selected in the game then the player and any entered collateral players who have selected 23 numbers to be drawn for a result will share the value of the Bingo Total Revenue Base−(house tax+seeding if required) held for the game.

What is claimed is:

1. A method for distributing a progressive jackpot among players at progressive linked gaming machines comprising:

providing a plurality of gaming machines, each of said gaming machines being capable of a) accepting a bet of an amount of money from a player, b) after accepting said bet, performing a play cycle initiated by said player, and c) generating an outcome of said play cycle, said outcome being one of a plurality of possible outcomes, at least one of said outcomes being a progressive jackpot-winning outcome;

collecting betting data from said gaming machines, said betting data representing said amounts of money bet by players at each of said machines;

determining from said betting data the value of a progressive jackpot;

detecting the occurrence of said progressive jackpot-winning outcome at one of said gaming machines; and, upon the occurrence of said progressive jackpot-winning outcome, distributing at least a portion of said progressive jackpot among a plurality of eligible players, all of whom will receive a portion of said jackpot, selected from among said players playing at said plurality of gaming machines, said eligible players being selected independently of any of said outcomes at said plurality of said gaming machines.

2. The method of claim 1, wherein a plurality of progressive jackpots are accumulated and distributed upon the occurrence of a progressive jackpot-winning outcome.

* * * * *